United States Patent
Berry et al.

[11] Patent Number: 5,463,306
[45] Date of Patent: Oct. 31, 1995

[54] APPARATUS FOR DETECTING COMPLETION OF ENERGY TRANSFER IN AN INDUCTIVE DC TO DC CONVERTER

[75] Inventors: James E. Berry, Austin, Tex.; Gary L. Pace, Boca Raton, Fla.; Barry W. Herold, Boca Raton, Fla.; Kevin McLaughlin, Lake Worth, Fla.; Margaret Graham-Meighan, Boynton Beach, Fla.

[73] Assignee: Motorola, Inc., Schaumburg, Ill.

[21] Appl. No.: 93,488

[22] Filed: Jul. 19, 1993

[51] Int. Cl.$^6$ .................................................. G05F 1/575
[52] U.S. Cl. .................... 323/222; 323/225; 323/284; 323/285
[58] Field of Search ................................ 323/222, 225, 323/271, 272, 282, 284, 285, 223; 327/51, 56

[56] References Cited

U.S. PATENT DOCUMENTS

| | | | |
|---|---|---|---|
| 4,539,495 | 9/1985 | Demler | 307/530 |
| 4,634,956 | 1/1987 | Davis et al. | 323/222 |
| 4,961,006 | 10/1990 | Pace et al. | 307/270 |
| 4,982,141 | 1/1991 | Pace et al. | 315/169.3 |
| 5,028,861 | 7/1991 | Pace et al. | 323/222 |
| 5,095,224 | 3/1992 | Renger | 307/270 |

OTHER PUBLICATIONS

Richard Redl, Nathan Sokal and Laszlo Balogh, "A Novel Soft–Switching Full–Bridge DC/DC Converter: Analysis, Design Considerations, and Experimental Results at 1.5 kW, 100 kHz", IEEE Transactions on Power Electronics, vol. 6, No. 3, Jul. 1991, 408–418.

Stabilizing Magamp Control Loop by Using an Inner–Loop Compensation, Yang et al. IEEE Transactions in Power Electronis, vol. 6, No. 3 Jul. 1991, pp. 419–429.

Comparison of Load Commutated Inverter Systems for Induction on Henating and Melting Applications Dawson, IEEE Transactions in Power Electronis, vol. 6, No. 3 Jul. 1991, pp. 430–441.

Parallel Processing Inverter System–Kawabata et al. IEE Transactions on Power Electronics, vol. 6, No. 3 Jul. 1991, pp. 442–462.

Angle Controlled Current Regulated Rectifies for AC/AC Converters–Habelter et al. IEEE Transactions on Power Electronics, vol. 6, No. 3 Jul. 1991 pp. 463–475.

*Primary Examiner*—Peter S. Wong
*Assistant Examiner*—Adolf Berhane
*Attorney, Agent, or Firm*—R. Louis Breeden

[57] ABSTRACT

A detector circuit (301) is utilized in a DC to DC converter (300) having an inductor (356) coupled to a switch (358) for interrupting an electric current through the inductor (356), thereby allowing the inductor (356) to transfer stored energy to a capacitive load (364). The detector circuit (301) includes a capacitor (302) coupled to the inductor (356) for generating a transient current (428) in response to a completion of a transfer of stored energy from the inductor (356). The detector circuit (301) further includes a reference current generator (306) for generating a reference current, and a summing node (304) coupled to the capacitor (302) and coupled to the reference current generator (306) for summing the transient current (428) and the reference current. The two summed currents form a transient control current (436) responsive to the completion (424) of the transfer of stored energy from the inductor (356).

18 Claims, 3 Drawing Sheets

5,463,306

APPARATUS FOR DETECTING COMPLETION OF ENERGY TRANSFER IN AN INDUCTIVE DC TO DC CONVERTER

FIELD OF THE INVENTION

This invention relates in general to DC to DC converter circuits, and more specifically to a circuit for detecting a completion of energy transfer in a DC to DC converter.

BACKGROUND OF THE INVENTION

Inductive DC to DC converters are well known in the art of electronic power supplies. Such converters operate by using an electronic switch to pass a current through an inductor and then interrupt the current periodically to produce a "flyback" voltage for transfer through a diode to a capacitive load. These converters are especially useful in battery powered equipment, such as portable communication receivers, in which most elements of the equipment can operate from a low voltage, e.g., 1.5 volt, power supply, but one or more of the elements require a substantially higher DC or AC supply voltage.

Because battery life is normally of great concern in battery powered equipment, inductive DC to DC converters must be designed to operate efficiently. A conventional method of improving the efficiency of such converters is to utilize a peak coil current control circuit to prevent the current through the inductor from exceeding a predetermined level beyond which the magnetic core of the inductor would saturate, thus rendering it substantially impossible to store additional energy in the inductor.

Even with the utilization of the peak coil current control circuit, the conventional inductive DC to DC converter can lose efficiency because the timing of each periodic transfer of stored energy from the inductor to capacitive load is not precisely controlled. For greatest efficiency, the ideal operating cycle would first transfer all of the stored energy from the inductor and then would begin immediately recharging the inductor with energy. Unfortunately, variations in battery voltage, coil inductance, parasitic capacitances and resistances, etc. cause the time required per ideal cycle to vary from one converter to the next, thus rendering it very difficult to generate the ideal cycle solely on the basis of timing.

To ensure that all of the energy stored in the inductor is transferred to the load during each cycle, the conventional converter allows an extra margin of time before beginning the next recharging cycle. Unfortunately, the extra margin of time causes a departure from the ideal cycle, thereby reducing efficiency. In addition, at the point of total energy transfer the diode coupling the inductor to the capacitive load becomes reverse biased, thereby presenting a high impedance to the inductor, which allows the inductor voltage to oscillate or "ring" with parasitic capacitances present in the electronic switch. Such oscillations can produce catastrophic effects in nearby circuit elements, e.g., turning on parasitic transistors, causing devices to latch, desensitizing a radio receiver, etc.

Thus, what is needed is an apparatus for maximizing the efficiency of an inductive DC to DC converter. It is highly desirable that the apparatus also prevent the potentially damaging oscillations encountered in the conventional converter.

SUMMARY OF THE INVENTION

One aspect of the present invention is a detector circuit for use in a DC to DC converter having an inductor coupled to a switch for interrupting an electric current through the inductor, thereby allowing the inductor to transfer stored energy to a capacitive load. The detector circuit comprises a voltage differentiation element coupled to the inductor for generating a transient current in response to a completion of a transfer of stored energy from the inductor. The detector circuit further comprises a reference current generator for generating a reference current, and a summing element coupled to the voltage differentiation element and coupled to the reference current generator for summing the transient current and the reference current, thereby generating a transient control current responsive to the completion of the transfer of stored energy from the inductor. In addition, the detector circuit includes a logic conversion element coupled to the summing element for converting the transient control current into a transfer-complete signal.

Another aspect of the present invention is a DC to DC converter for providing a boosted voltage to a capacitive load, the DC to DC converter comprising first and second power supply nodes, and an inductor coupled to the first power supply node for storing energy received therefrom. The DC to DC converter further comprises a switch coupled to the inductor and coupled to the second power supply node for repeatedly passing and then interrupting an electric current through the inductor, whereby the inductor transfers the stored energy to the capacitive load in response to the electric current being interrupted. The DC to DC converter further comprises a peak coil current detector coupled to the switch for generating a peak-current detection signal in response to the electric current having reached a predetermined peak current level. The DC to DC converter further comprises a detector circuit coupled to the inductor for generating a transfer-complete signal in response to the stored energy having been transferred completely from the inductor to the capacitive load. The detector circuit comprises a voltage differentiation element coupled to the inductor for generating a transient current in response to a completion of a transfer of stored energy from the inductor, and a reference current generator for generating a reference current. The detector circuit further comprises a summing element coupled to the voltage differentiation element and coupled to the reference current generator for summing the transient current and the reference current, thereby generating a transient control current responsive to the completion of the transfer of stored energy from the inductor. The detector circuit also includes a logic conversion element coupled to the summing element for converting the transient control current into the transfer-complete signal. The DC to DC converter further comprises a switch control element coupled to the switch and responsive to the peak-current detection signal and to the transfer-complete signal for controlling the switch.

Another aspect of the present invention is a radio communication receiver, comprising first and second power supply nodes within the radio communication receiver for supplying power thereto, and an antenna for intercepting a radio signal comprising information. The radio communication receiver further comprises a receiver element coupled to the antenna for demodulating the intercepted radio signal to derive the information, and a processor coupled to the receiver element for processing the demodulated information. The radio communication receiver further comprises an output element coupled to the processor for generating an output responsive to the processed information, and a DC to DC converter coupled to the first and second power supply nodes and coupled to the output element for providing a boosted voltage to the output element. The DC to DC converter comprises an inductor coupled to the first power supply node for storing energy received therefrom, and an electronic switch coupled to the inductor and coupled to the second power supply node for repeatedly passing and then interrupting an electric current through the inductor, whereby the inductor transfers the stored energy to the output element in response to the electric current being interrupted. The DC to DC converter further comprises a peak coil current detector coupled to the electronic switch for generating a peak-current detection signal in response to the electric current having reached a predetermined peak current level. The DC to DC converter further comprises a detector circuit coupled to the inductor for generating a transfer-complete signal in response to the stored energy having been transferred completely from the inductor to the output element. The detector circuit comprises a voltage differentiation element coupled to the inductor for generating a transient current in response to a completion of a transfer of stored energy from the inductor, and a reference current generator for generating a reference current. The detector circuit further comprises a summing element coupled to the voltage differentiation element and coupled to the reference current generator for summing the transient current and the reference current, thereby generating a transient control current responsive to the completion of the transfer of stored energy from the inductor. The detector circuit also includes a logic conversion element coupled to the summing element for converting the transient control current into the transfer-complete signal. The DC to DC converter further comprises a switch control element coupled to the switch and responsive to the peak-current detection signal and to the transfer-complete signal for controlling the switch.

DESCRIPTION OF THE PREFERRED EMBODIMENT

Figure 1:
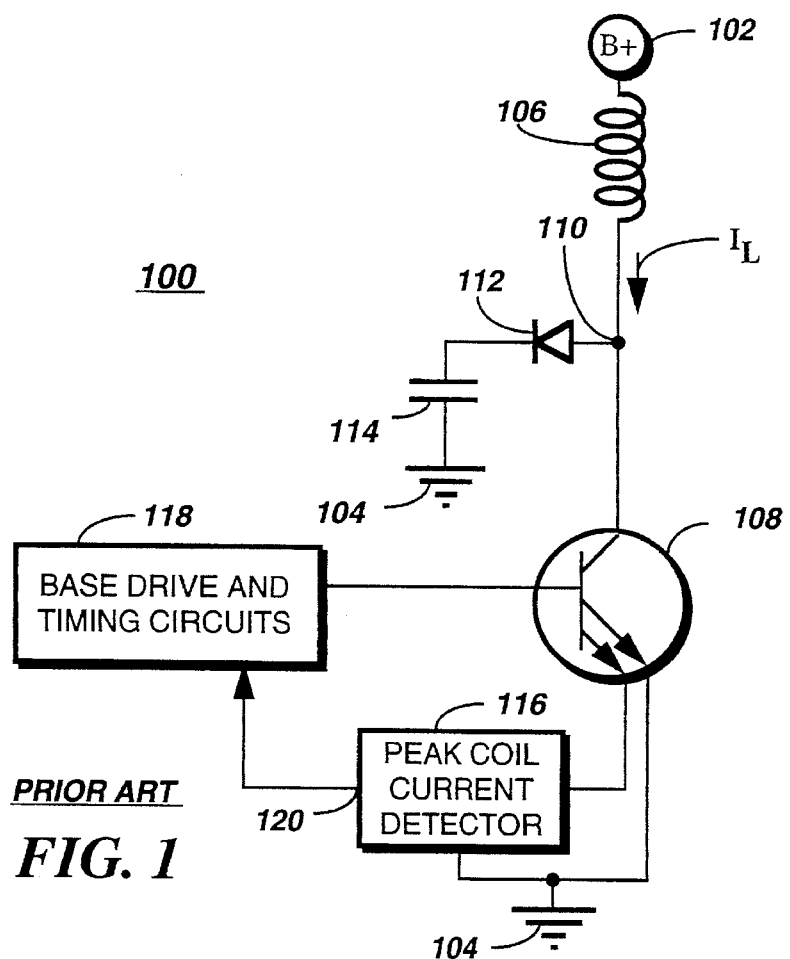
FIG. 1 is an electrical block diagram of a conventional inductive DC to DC converter.

Referring to FIG. 1, an electrical block diagram of a conventional inductive DC to DC converter 100 comprises a first power supply node 102 for supplying direct current from a power source, such as a battery, and a second power supply node 104, such as ground, for sinking the direct current. An inductor 106 is coupled between the first power supply node 102 and an intermediate node 110, which is coupled to the collector of a switching transistor 108 for alternately passing and then interrupting a current $I_L$ through the inductor. The intermediate node 110 is also coupled to the anode side of a diode 112, the cathode side of which is coupled to a first electrode of a capacitive load 114. The second electrode of the capacitive load 114 is coupled to the second power supply node 104.

A first emitter of the switching transistor 108 is coupled to the second power supply node 104 for sinking most of the current $I_L$, and a second emitter is coupled to a peak coil current detector 116 for generating a peak current detection logic signal at a peak-detect output 120 in response to the current $I_L$ reaching a predetermined level. The peak coil current detector 116 is also coupled to the second power supply node 104 for sinking operating currents therein. The peak-detect output 120 is coupled to base drive and timing circuits 118, which are coupled to the base of the switching transistor 108 for providing a drive current thereto.

During operation of the conventional inductive DC to DC converter 100 the base drive and timing circuits 118 drive the switching transistor 108 into saturation causing the current $I_L$ to rise linearly with time as the inductor 106 stores magnetic energy. When the current $I_L$ reaches the predetermined level, the peak coil current detector 116 provides a pulse to the base drive and timing circuits 118, causing the base drive and timing circuits 118 to turn off the switching transistor 108. The inductor 106 then attempts to maintain the current $I_L$ at the present level by raising the voltage of the intermediate node 110 to a level one diode drop above the voltage across the capacitive load 114.

As the current $I_L$ flows into the capacitive load 114, the voltage across the capacitive load increases over time in proportion to the current $I_L$. After a predetermined time, the base drive and timing circuits 118 will again drive the switching transistor 108 into saturation, causing the entire process to repeat. To ensure that all of the stored energy is transferred to the capacitive load 114 when circuit component values depart from nominal, the predetermined time typically is somewhat longer than the energy transfer time calculated for nominal values.

Figure 2:
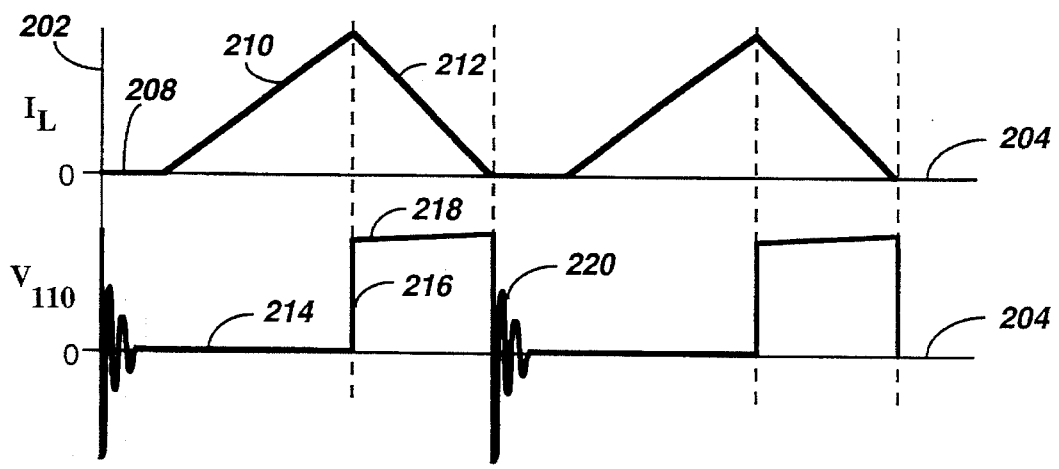
FIG. 2 is a timing diagram depicting current and voltage waveforms in the conventional inductive DC to DC converter.

Referring to FIG. 2, a timing diagram depicts current and voltage waveforms in the conventional inductive DC to DC converter 100. The vertical axis 202 depicts the amplitude of current or voltage, while the horizontal axes 204 depict time. The diagram shows the current $I_L$ and the voltage $V_{110}$ (measured between the intermediate node 110 and the second power supply node 104) after the mean voltage across the load capacitance has reached a steady-state value, i.e., after the converter 100 has been operating for long enough for the mean voltage to have stabilized. The diagram depicting the current $I_L$ shows that after the stored energy has been transferred completely to the capacitive load 114, and before the base drive and timing circuits 118 drive the switching transistor 108 back into saturation, the current $I_L$ is substantially zero 208. Then, after the base drive and timing circuits 118 drive the switching transistor 108 back into saturation, the current $I_L$ rises substantially linearly 210 to the predetermined peak level, where the switching transistor 108 is turned off. Then, as the stored energy is transferred from the inductor 106 to the to capacitive load 114, the current $I_L$ falls substantially linearly 212 until all the stored energy has been transferred, after which the cycle repeats.

The diagram depicting the voltage $V_{110}$ shows that the voltage $V_{110}$ is held at substantially zero 214 while the switching transistor 108 is in saturation. Then, after the switching transistor 108 is turned off, the voltage $V_{110}$ rises rapidly 216 to one diode drop above the voltage across the capacitive load 114, after which the voltage $V_{110}$ increases slightly 218 as the capacitive load 114 absorbs the stored energy. When the stored energy has transferred completely, the voltage $V_{110}$ falls rapidly, reverse biasing the diode 112, and allowing the inductance of the inductor 106 to oscillate 220 with parasitic capacitances of the switching transistor 108. As discussed herein in the Background of the Invention, such oscillations can produce catastrophic effects in nearby circuit elements and are therefore not desirable.

For further details concerning the construction and operation of the conventional inductive DC to DC converter 100, one is referred to U.S. Pat. Nos. 4,961,006, 4,982,141, and 5,028,861, to Pace et al., and U.S. Pat. No. 4,634,956 to Davis et al. These four U.S. Patents are assigned to the assignee of the present invention and are hereby incorporated herein by reference.

Figure 3:
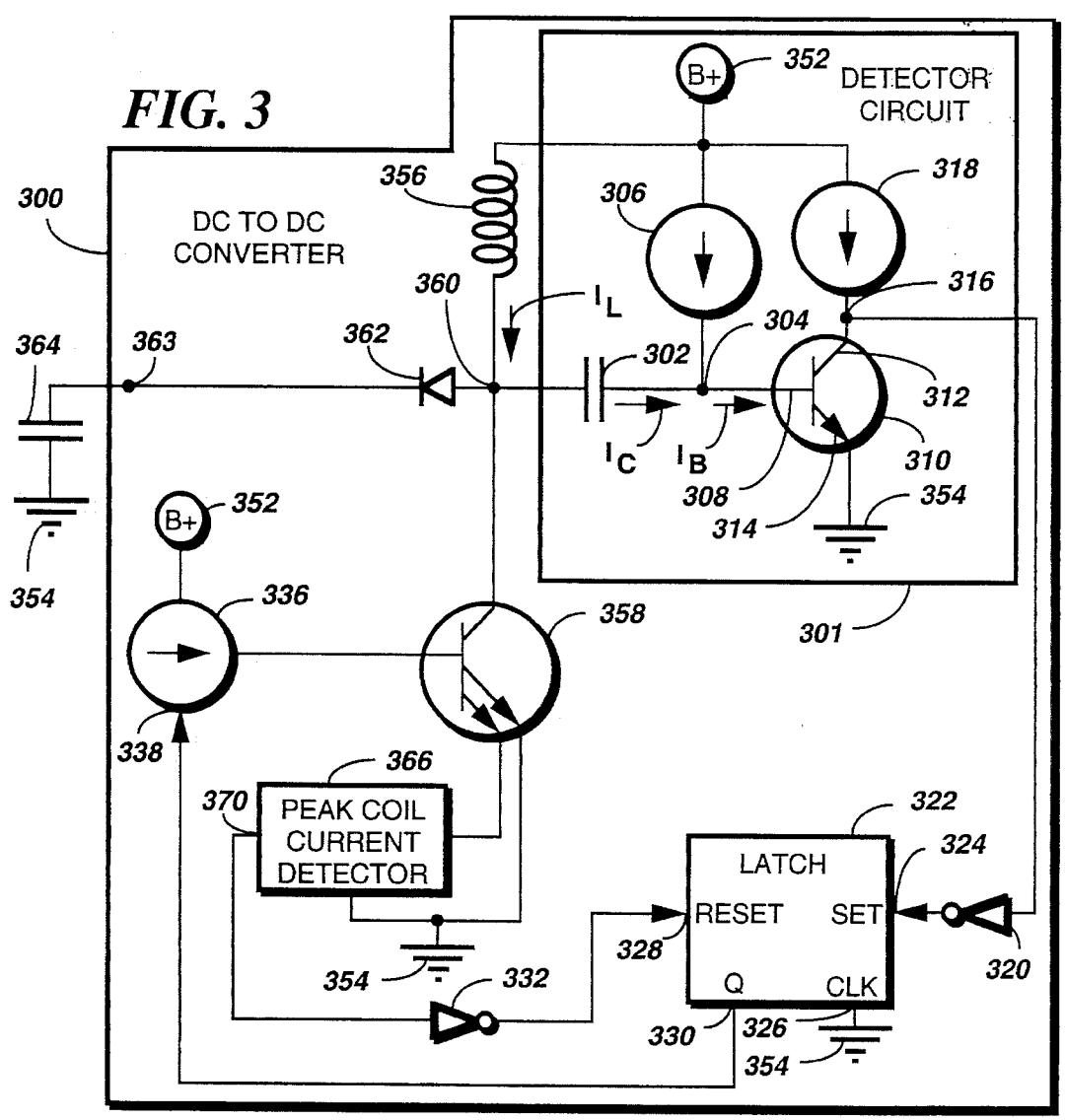
FIG. 3 is an electrical block diagram of an inductive DC to DC converter in accordance with the preferred embodiment of the present invention.

Referring to FIG. 3, an electrical block diagram of an inductive DC to DC converter 300 in accordance with the preferred embodiment of the present invention comprises a first power supply node 352 for supplying direct current from a power source, such as a battery, and a second power supply node 354 for sinking the direct current. An inductor 356 is coupled between the first power supply node 352 and an intermediate node 360, which is coupled to the collector of a switching transistor 358 for alternately passing and then interrupting a current $I_L$ through the inductor. The intermediate node 360 is also coupled to the anode side of a diode 362, the cathode side of which is coupled to a first electrode of a capacitive load 364 through an output node 363. The second electrode of the capacitive load 364 is coupled to the second power supply node 354. Preferably, the capacitance of the capacitive load 364 is on the order of one nanofarad, and the inductance of the inductor 356 is on the order of five millihenrys. It will be appreciated that other values of capacitance and inductance can be used for the capacitive load 364 and the inductor 364, depending upon the application for which the DC to DC converter 300 is intended.

A first emitter of the switching transistor 358 is coupled to the second power supply node 354 for sinking most of the current $I_L$, and a second emitter is coupled to a peak coil current detector 366 for generating a peak current detect signal at a peak-detect output 370 in response to the current $I_L$ reaching a predetermined level. Preferably, the peak coil current detector 366 is similar to the peak coil current control circuit disclosed in U.S. Pat. No. 5,028,861 to Pace et al. It will be appreciated that other similar circuits may be used as well for the peak coil current detector 366. The peak coil current detector 366 is also coupled to the second power supply node 354 for sinking operating currents therein. The peak-detect output 370 is coupled through an inverter 332 to the RESET terminal 328 of a latch 322 for controlling base drive current for the switching transistor 358, as will be described herein below.

During operation, the inductive DC to DC converter 300 transfers stored energy from the inductor 356 to the capacitive load 364 when the switching transistor 358 interrupts the current $I_L$ through the inductor. To avoid interrupting the current $I_L$ for longer than necessary to completely transfer the stored energy, the inductive DC to DC converter 300 utilizes a detector circuit 301 for detecting the completion of the energy transfer and for controlling the switching transistor 358 to immediately begin passing current through the inductor 356 in response to the detected completion of the energy transfer.

The detector circuit 301 comprises a capacitor 302 coupled between the intermediate node 360 and a summing node 304 for generating a transient current $I_C$ in response to a completion of a transfer of stored energy from the inductor 356 to the capacitive load 364. The detector circuit 301 further comprises a first current source 306 coupled between the first power supply node 352 and the summing node 304 for providing a reference current to the summing node 304. The summing node 304 is coupled to the base 308 of a logic converter transistor 310 for supplying a base drive current $I_B$ to the logic converter transistor 310. Preferably, the capacitance of the capacitor 302 is in the range of three to five picofarads. It will be appreciated that other values of capacitance can be used for the capacitor 302, depending upon the application for which the DC to DC converter 300 is intended.

The emitter 314 of the logic converter transistor 310 is coupled to the second power supply node 354, and the collector 312 is coupled to a transfer-complete logic output node 316 for providing a transfer-complete signal for controlling the switching transistor 358, as will be described herein below. A second current source 318 is coupled between the first power supply node 352 and the transfer-complete logic output node 316 for providing a bias current to the logic converter transistor 310. The transfer-complete logic output node 316 is coupled through an inverter 320 to the SET terminal 324 of the latch 322 for controlling base drive current for the switching transistor 358, as will be described below. Preferably, the latch is a MC74HC109 J-K Flip-Flop, manufactured by Motorola, Inc. of Schaumburg Ill. It will be appreciated that other comparable latches may be used as well.

The CLOCK input 326 of the latch 322 is coupled to the second power supply node 354, while the Q output 330 is coupled to the control input 338 of a controllable current source 336 for turning the controllable current source 336 on and off in response to the logical state of the Q output 330 of the latch 322. The controllable current source 336 is coupled to the base of the switching transistor 358 for alternately supplying and interrupting base drive current for the switching transistor 358.

Figure 4:
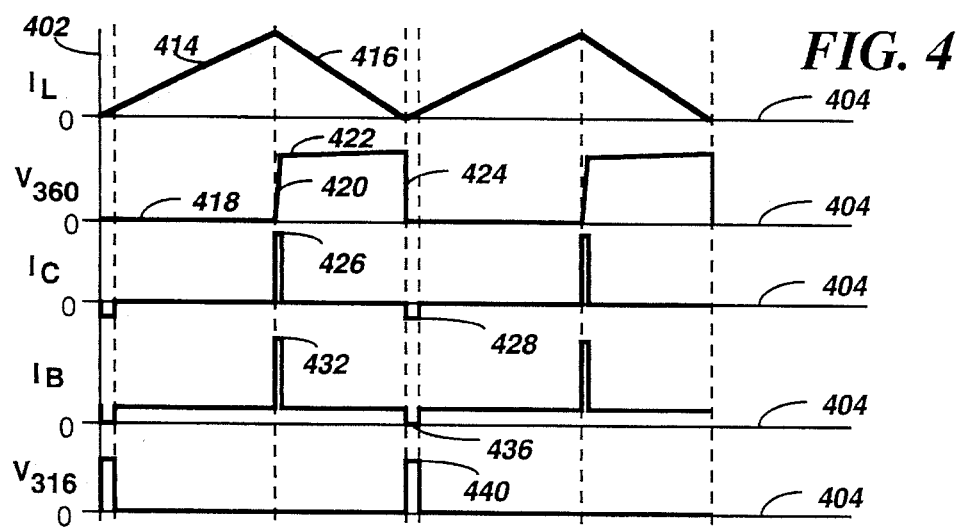
FIG. 4 is a timing diagram depicting current and voltage waveforms in the inductive DC to DC converter in accordance with the preferred embodiment of the present invention.

Operation of the inductive DC to DC converter 300 may best be understood by referring to FIG. 4, which is a timing diagram depicting current and voltage waveforms in the inductive DC to DC converter 300 in accordance with the preferred embodiment of the present invention. The vertical axis 402 represents amplitude of current or voltage, while the horizontal axes 404 represent time. The diagram depicts current and voltage values as they would be after the mean voltage across the capacitive load 364 has reached a steady state level, i.e., after the converter 300 has been operating for long enough for the mean voltage to have stabilized.

The diagram of the current $I_L$ shows that the current $I_L$ increases substantially linearly 414 after the switching transistor 358 is turned on. When the peak coil current detector 366 detects that the current $I_L$ has reached the predetermined level, the peak coil current detector 366 generates a peak current detection pulse at the peak-detect output 370, which resets the latch 322, thereby turning off the controllable current source 336, and thus also turning off the switching transistor 358. In response, the current $I_L$ decreases substantially linearly 416 after the switching transistor 358 is turned off.

While the switching transistor 358 is turned on, the voltage $V_{360}$, i.e., the voltage at the intermediate node 360 measured with respect to the second power supply node, is substantially zero 418. When the switching transistor 358 turns off, the voltage $V_{360}$ rises rapidly 420 as the capacitor 302 charges from the pulse 426 in the current $I_C$. The pulse 426 sums with the current from the first current source 306 to produce a pulse 432 in the base drive current $I_B$, but the pulse 432 produces little change in the voltage $V_{316}$ at the transfer-complete logic output node 316, because the logic converter transistor 310 is already turned on by the base drive current $I_B$ flowing from the first current source 306.

When the voltage $V_{360}$ reaches a voltage one diode drop above the voltage across the capacitive load 364, the diode 362 starts to conduct, slowing 422 the increase in the voltage $V_{360}$ to a rate determined by the capacitance of the load 364 and the current $I_L$. When substantially all of the energy stored in the inductor 356 has been transferred from the inductor 356, the voltage $V_{360}$ falls rapidly 424 towards zero, after which the cycle repeats.

The rapid fall of the voltage $V_{360}$ causes a transient negative pulse 428 in the current $I_C$. The transient negative pulse 428 in the current $I_C$, when summed with the current from the first current source 306, produces a transient interruption 436 in the base drive current $I_B$, thereby momentarily turning off the logic converter transistor 310, and generating a pulse 440 in the voltage $V_{316}$ at the transfer-complete logic output node 316, the pulse representing a transfer-complete signal.

When the transfer-complete signal propagates to the latch 322, the latch 322 is set, thus providing a high signal at the Q output 330 of the latch 322 and at the control input 338 of the controllable current source 336. The high signal at the control input 338 enables the controllable current source 336, which turns on the switching transistor 358, thereby immediately starting another cycle of energy storage in the inductor 356. The latch 322 remains set until the current $I_L$ reaches the predetermined level at which the peak coil current detector 366 will generate a pulse representing the peak-current detect signal at the peak-detect output 370. When the peak-current detect signal propagates to the latch 322, the latch 322 is reset, thereby turning off the controllable current source 336 and the switching transistor 358, allowing the stored energy in the inductor 356 to again begin transferring to the capacitive load 364 as described above.

Thus, the present invention provides an apparatus that advantageously maximizes the operating efficiency of an inductive DC to DC converter by substantially eliminating any time periods in which the current through the inductor remains at zero. The improvement in efficiency is particularly desirable in battery powered equipment, in which battery life is of prime importance. The present invention also substantially prevents the potentially catastrophic oscillations that can occur in conventional converters after the completion of energy transfer from the inductor, thus improving equipment reliability.

It will be appreciated that the detector circuit 301, the latch 322, the inverters 320 and 332, the peak coil current detector 366, the controllable current source 336, the switching transistor 358, and the diode 362 can in part or in whole be constructed as one or more contiguous integrated circuits.

Figure 5:
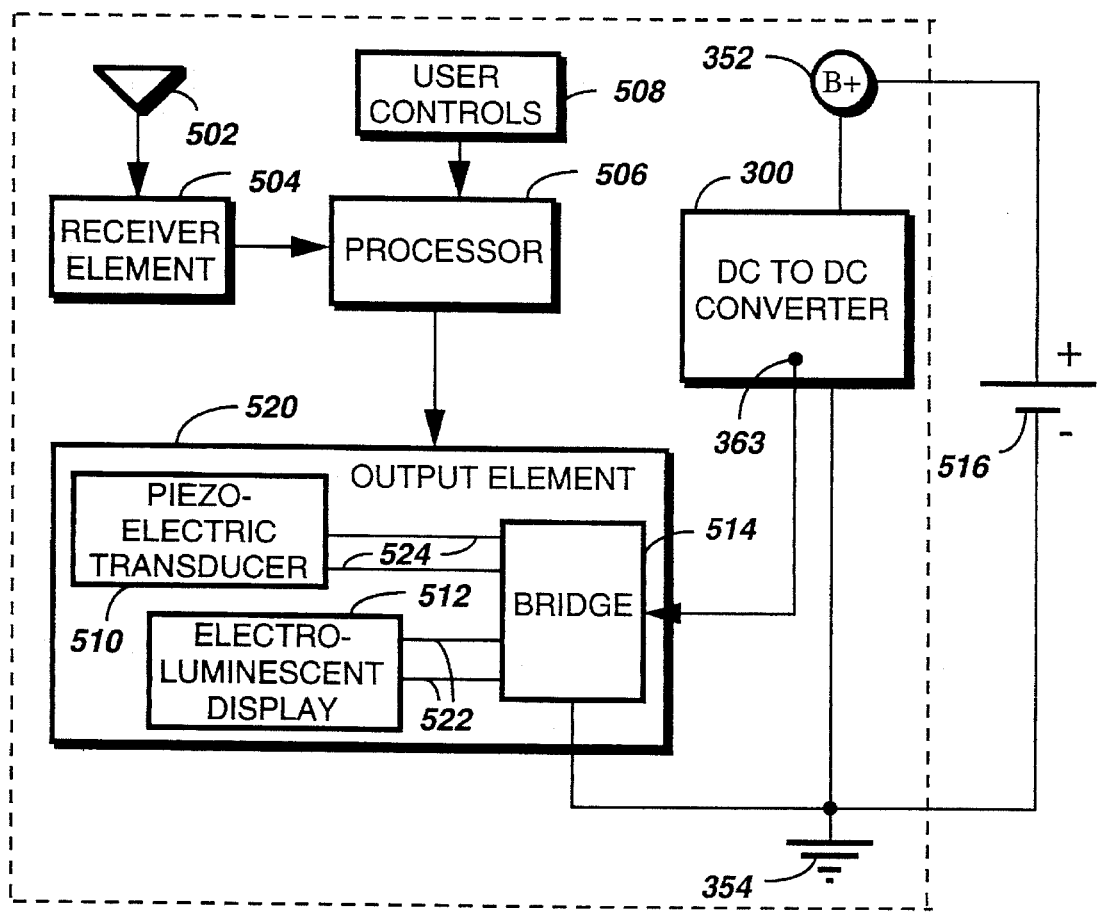
FIG. 5 is an electrical block diagram of a radio communication receiver in accordance with the preferred embodiment of the present invention.

Referring to FIG. 5, an electrical block diagram of a radio communication receiver 500 in accordance with the preferred embodiment of the present invention comprises an antenna 502 for intercepting a radio signal comprising information. The antenna 502 is coupled to a receiver element 504 for demodulating the intercepted radio signal to derive the information. The receiver element 504 is coupled to a processor 506 for processing the demodulated information. An output element 520 is coupled to the processor 506 and comprises a piezo-electric transducer 510 for generating an alert under control of the processor 506. The output element 520 further comprises an electroluminescent display 512 for displaying the demodulated information under the control of the processor 506. The output element 520 further comprises a conventional bridge circuit 514 for interconnecting the piezo-electric transducer 510 and the electroluminescent display 512 with the second power supply node 354 and with the output node 363 of the inductive DC to DC converter 300 in accordance with the preferred embodiment of the present invention through power interconnections 522, 524. An additional function of the bridge circuit 514 is to commutate the power interconnections 522 to the electroluminescent display 512 to convert the DC power of the DC to DC converter 300 into AC power, as required for the electroluminescent display 512. The output element 520 produces a capacitive load on the DC to DC converter 300, similar to the capacitive load 364 (FIG. 3).

The radio communication receiver 500 further comprises a battery 516 having a positive terminal coupled to the first power supply node 352 and a negative terminal coupled to the second power supply node 354 for providing power to the DC to DC converter 300. The battery 516 also provides power to the receiver element 504, the processor 506, and the output element 520 through the first and second power supply nodes 352, 354. The radio communication receiver 500 further comprises well-known user controls 508, such as buttons, knobs, and sliders for providing user control of the operation of the radio communication receiver 500.

Thus, the present invention advantageously provides an apparatus for maximizing the efficiency of an inductive DC to DC converter. Efficient power usage is especially important in battery powered devices, such as portable selective call receivers, in which battery life is a primary design objective. The present invention also substantially prevents the potentially damaging oscillations encountered in the conventional inductive DC to DC converter, thereby increasing equipment reliability.

What is claimed is:

1. A detector circuit for use in a DC to DC converter having an inductor coupled to switch means for interrupting an electric current through the inductor, thereby allowing the inductor to transfer stored energy to a capacitive load, said detector circuit comprising:

voltage differentiation means coupled to the inductor for generating a transient current in response to a completion of a transfer of stored energy from the inductor;

reference current generator means for generating a reference current;

summing means coupled to said voltage differentiation means and coupled to said reference current generator means for summing the transient current and the reference current, thereby generating a transient control current responsive to the completion of the transfer of stored energy from the inductor; and logic conversion means coupled to said summing means for converting the transient control current into a transfer-complete signal.

2. The detector circuit according to claim 1, further comprising a first power supply node, wherein said voltage differentiation means comprises a coupling capacitor having a first electrode coupled to the inductor, and wherein said reference current generator means comprises a first current source coupled to said first power supply node, and wherein said summing means is a current summing node coupled to said first current source and coupled to a second electrode of said coupling capacitor.

3. The detector circuit according to claim 2, further comprising a second power supply node, and wherein said logic conversion means comprises:

a transfer-complete logic output node;

a second current source coupled between said first power supply node and said transfer-complete logic output node; and a transistor having a base coupled to said current summing node, an emitter coupled to said second power supply node, and a collector coupled to said transfer-complete logic output node.

4. A DC to DC converter for providing a voltage to a capacitive load, the DC to DC converter comprising:

first and second power supply nodes;

an inductor coupled to said first power supply node for storing energy received therefrom;

switch means coupled to said inductor and coupled to said second power supply node for repeatedly passing and then interrupting an electric current through said inductor, whereby said inductor transfers the stored energy to the capacitive load in response to the electric current being interrupted;

peak coil current detection means coupled to said switch means for generating a peak-current detection signal in response to the electric current having reached a predetermined peak current level; and a detector circuit coupled to said inductor for generating a transfer-complete signal in response to the stored energy having been transferred completely from said inductor to the capacitive load, said detector circuit comprising:

voltage differentiation means coupled to the inductor for generating a transient current in response to a completion of a transfer of stored energy from the inductor;

reference current generator means for generating a reference current;

summing means coupled to said voltage differentiation means and coupled to said reference current generator means for summing the transient current and the reference current, thereby generating a transient control current responsive to the completion of the transfer of stored energy from the inductor; and logic conversion means coupled to said summing means for converting the transient control current into the transfer-complete signal, wherein the DC to DC converter further comprises switch control means coupled to said switch means and responsive to the peak-current detection signal and to the transfer-complete signal for controlling said switch means.

5. The DC to DC converter according to claim 4, wherein said switch control means controls said switch means to resume passing the electric current in response to the transfer-complete signal, and wherein said switch control means controls said switch means to interrupt the electric current in response to the peak-current detection signal.

6. The DC to DC converter according to claim 4, wherein said voltage differentiation means comprises a coupling capacitor having a first electrode coupled to said inductor, and wherein said reference current generator means comprises a first current source coupled to said first power supply node, and wherein said summing means is a current summing node coupled to said first current source and coupled to a second electrode of said coupling capacitor.

7. The DC to DC converter according to claim 6, wherein said logic conversion means comprises:

a transfer-complete logic output node;

a second current source coupled between said first power supply node and said transfer-complete logic output node; and a first transistor having a base coupled to said current summing node, an emitter coupled to said second power supply node, and a collector coupled to said transfer-complete logic output node.

8. The DC to DC converter according to claim 4, wherein said switch means comprises a second transistor having a base coupled to said switch control means, a first emitter coupled to said second power supply node, a second emitter coupled to said peak coil current detection means, and a collector coupled to said inductor.

9. The DC to DC converter according to claim 8, wherein said switch control means comprises:

a switchable current source coupled between said first power supply node and the base of said second transistor for providing a switchable drive current to said second transistor; and a latch coupled to said switchable current source and coupled to said detector circuit and to said peak coil current detection means for controlling said switchable current source in response to signals received therefrom, wherein said latch latches said switchable current source in an active state in response to receiving the transfer-complete signal from said detector circuit, and wherein said latch latches said switchable current source in an inactive state in response to receiving the peak-current detection signal from said peak coil current detection means.

10. A radio communication receiver, comprising:

first and second power supply nodes within the radio communication receiver for supplying power thereto;

an antenna for intercepting a radio signal comprising information;

a receiver element coupled to said antenna for demodulating the intercepted radio signal to derive the information;

a processor coupled to said receiver element for processing the demodulated in formation;

an output element coupled to said processor for generating an output responsive to the processed information; and a DC to DC converter coupled to said first and second power supply nodes and coupled to said output element for providing a voltage to said output element, said DC to DC converter comprising:

an inductor coupled to said first power supply node for storing energy received therefrom;

an electronic switch coupled to said inductor and coupled to said second power supply node for repeatedly passing and then interrupting an electric current through said inductor, whereby said inductor transfers the stored energy to said output element in response to the electric current being interrupted;

a peak coil current detector coupled to said electronic switch for generating a peak-current detection signal in response to the electric current having reached a predetermined peak current level; and a detector circuit coupled to said inductor for generating a transfer-complete signal in response to the stored energy having been transferred completely from said inductor to said output element, said detector circuit comprising:

a voltage differentiation element coupled to the inductor for generating a transient current in response to a completion of a transfer of stored energy from the inductor;

a reference current generator for generating a reference current;

a summing element coupled to said voltage differentiation element and coupled to said reference current generator for summing the transient current and the reference current, thereby generating a transient control current responsive to the completion of the transfer of stored energy from the inductor; and a logic converter coupled to said summing element for converting the transient control current into the transfer-complete signal, wherein the DC to DC converter further comprises a switch control element coupled to said electronic switch and responsive to the peak-current detection signal and to the transfer-complete signal for controlling said electronic switch.

11. The radio communication receiver according to claim 10, wherein said switch control element controls said electronic switch to resume passing the electric current in response to the transfer-complete signal, and wherein said switch control element controls said electronic switch to interrupt the electric current in response to the peak-current detection signal.

12. The radio communication receiver according to claim 10, wherein said output element produces a capacitive load on said DC to DC converter.

13. The radio communication receiver according to claim 10, wherein said output element comprises an electroluminescent panel.

14. The radio communication receiver according to claim 10, wherein said output element comprises a piezo-electric transducer.

15. The radio communication receiver according to claim 10, wherein said voltage differentiation element comprises a coupling capacitor having a first electrode coupled to said inductor, and wherein said reference current generator comprises a first current source coupled to said first power supply node, and wherein said summing element is a current summing node coupled to said first current source and coupled to a second electrode of said coupling capacitor.

16. The radio communication receiver according to claim 15, wherein said logic converter comprises:

a transfer-complete logic output node;

a second current source coupled between said first power supply node and said transfer-complete logic output node; and a first transistor having a base coupled to said current summing node, an emitter coupled to said second power supply node, and a collector coupled to said transfer-complete logic output node.

17. The radio communication receiver according to claim 10, wherein said electronic switch comprises a second transistor having a base coupled to said switch control element, an emitter coupled to said second power supply node, a second emitter coupled to said peak coil current detector, and a collector coupled to said inductor.

18. The radio communication receiver according to claim 17, wherein said switch control element comprises:

a switchable current source coupled between said first power supply node and the base of said second transistor for providing a switchable drive current to said second transistor; and a latch coupled to said switchable current source and coupled to said detector circuit and to said peak coil current detector for controlling said switchable current source in response to signals received therefrom, wherein said latch latches said switchable current source in an active state in response to receiving the transfer-complete signal from said detector circuit, and wherein said latch latches said switchable current source in an inactive state in response to receiving the peak-current detection signal from said peak coil current detector.

* * * * *